(12) United States Patent
Kobayashi et al.

(10) Patent No.: US 6,287,647 B1
(45) Date of Patent: Sep. 11, 2001

(54) LIQUID CRYSTAL COMPOSITION AND LIQUID CRYSTAL DISPLAY USING THE SAME

(75) Inventors: Nobuyuki Kobayashi, Kobe; Masako Iwamatsu, Toyonaka; Hideaki Ueda, Kishiwada, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/450,723

(22) Filed: Nov. 30, 1999

(30) Foreign Application Priority Data

Dec. 3, 1999 (JP) .................................................. 10-344392

(51) Int. Cl.⁷ .......................... C09K 19/52; C09K 19/30; G02F 1/1333
(52) U.S. Cl. ................. 428/1.1; 252/299.01; 252/299.63
(58) Field of Search .................. 428/1.1; 252/299.01, 252/299.63

(56) References Cited

U.S. PATENT DOCUMENTS

| | | | |
|---|---|---|---|
| 4,264,148 | 4/1981 | Göbl-Wunsch et al. | 349/88 |
| 5,356,562 * | 10/1994 | Greenfield et al. | 252/299.63 |
| 5,399,292 * | 3/1995 | Buchecker et al. | 252/299.63 |
| 5,447,657 * | 9/1995 | Schadt et al. | 252/299.01 |
| 5,560,865 * | 10/1996 | Nakagawa et al. | 252/299.01 |
| 5,653,912 * | 8/1997 | Nakagawa et al. | 252/299.01 |
| 5,681,504 * | 10/1997 | Buchecker et al. | 252/299.61 |
| 5,766,518 | 6/1998 | Ishii | 252/582 |
| 5,807,499 * | 9/1998 | Terashima et al. | 252/299.63 |
| 5,932,301 * | 8/1999 | Kamiyama et al. | 427/588 |
| 6,107,447 * | 8/2000 | Kreuder et al. | 528/310 |
| 6,122,024 * | 9/2000 | Molsen et al. | 349/88 |

* cited by examiner

Primary Examiner—Shean C. Wu
(74) Attorney, Agent, or Firm—Burns, Doane, Swecker & Mathis, LLP

(57) ABSTRACT

A reflective type liquid crystal display which has a pair of substrates, at least one of which is transparent and a liquid crystal composition filled between the substrates. The liquid crystal composition contains a liquid crystal mixture and a chiral agent and exhibits a cholesteric phase in a room temperature. The liquid crystal mixture contains a liquid crystal phenylcyclohexane compound at 45 to 60 wt % and a liquid crystal tolan compound at 5 to 15 wt %.

19 Claims, 2 Drawing Sheets

F I G. 4
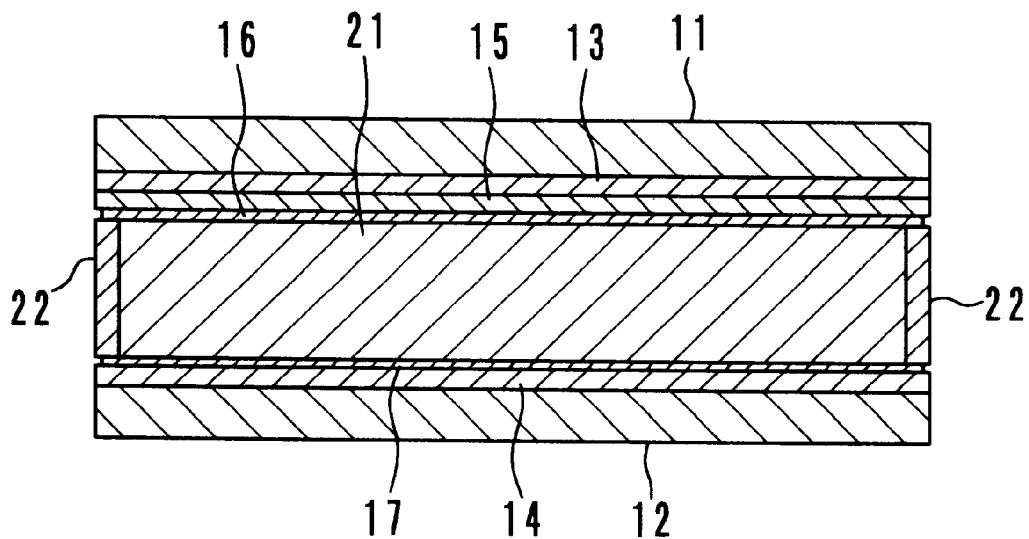
F I G. 5
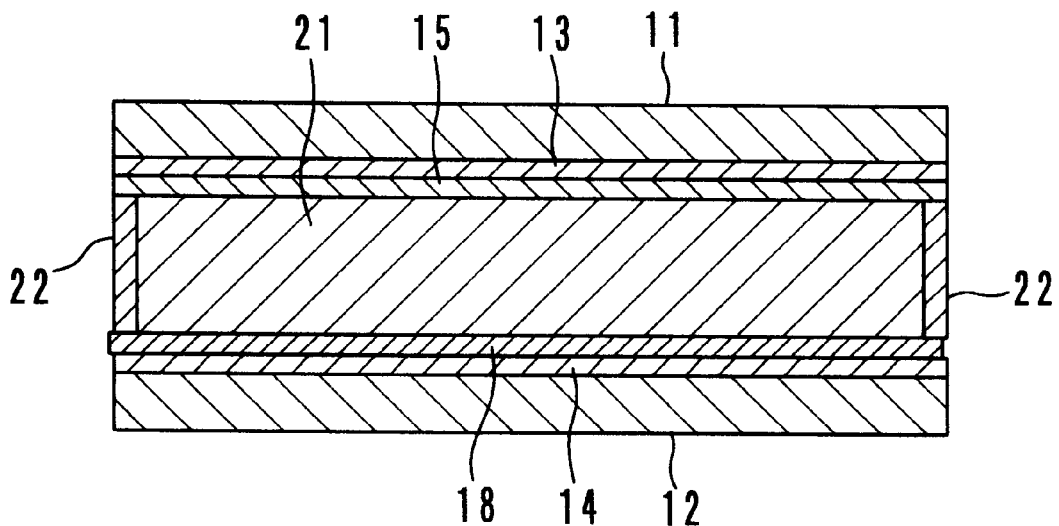

LIQUID CRYSTAL COMPOSITION AND LIQUID CRYSTAL DISPLAY USING THE SAME

This application is based on application No. 10-344392 filed in Japan, the content of which is hereby incorporated by reference.

BACKGROUND OF THE INVENTION

1. Field of the Invention

The present invention relates to a liquid crystal composition, and more particularly to a liquid crystal composition exhibiting a cholesteric phase in a room temperature. Further to this, the present invention also relates to a liquid crystal display using the above liquid crystal, and more particularly to a bistable/reflective type liquid crystal display.

2. Description of Related Art

Recently, studies have been made to develop reflective liquid crystal displays by using chiral nematic liquid crystal which is produced by adding a chiral agent to nematic liquid crystal to cause the liquid crystal to exhibit a cholesteric phase in a room temperature. Such a liquid crystal display makes a display by switching between a planar state and a focal-conic state in accordance with the level of the pulse voltage applied thereto.

At the present, however, in such a reflective liquid crystal display, the response speed to application of a voltage is low, and the contrast between the planar state and the focal-conic state is not sufficiently high. Liquid crystal displays of this type which satisfactorily complies with these demands and can be driven by a low voltage are yet to be developed.

SUMMARY OF THE INVENTION

A primary object of the present invention is to provide an improved liquid crystal composition, and liquid crystal display using the same.

Other object of the present invention is to provide a liquid crystal display which can be driven by a low voltage, responds to application of the voltage at a high speed and has high contrast between the planar state and the focal-conic state.

In order to attain at least one of the above mentioned objects, a liquid crystal display according to the present invention comprises: a pair of substrates, at least one of which is transparent; and between the substrates, a liquid crystal composition which exhibits a cholesteric phase and contains a liquid crystal mixture containing a liquid crystal phenylcyclohexane compound at approximately 45 to 60 wt % and a liquid crystal tolan compound at approximately 5 to 15 wt %.

Liquid crystal phenylcyclohexane compounds and liquid crystal tolan compounds have relatively large anisotropy of refractive index and have low viscosity. Liquid crystal containing these compounds, therefore, can be driven by a low voltage, and the response to application of the voltage is speedy. Also, because the reflectance in the coloring state is large, the contrast is high. Including a large volume of liquid crystal phenylcyclohexane compound, of which anisotropy of dielectric constant is large, in the liquid crystal is especially advantageous to lower the driving voltage.

If a liquid crystal phenylcyclohexane compound is contained too much (approximately 60 wt % or more), however, the compatibility of the liquid crystal with the peripheral material such as a sealant will be high, and the peripheral material may fuse into the liquid crystal composition, which will cause deterioration of display performance. If a liquid crystal tolan compound is contained too much (approximately 15 wt % or more), the anisotropy of dielectric constant of the liquid crystal will be small, and a higher voltage will be necessary to drive the liquid crystal. It is preferred that the total content of the liquid crystal phenylcyclohexane compound and the liquid crystal tolan compound is not more than approximately 70 wt % of the liquid crystal mixture.

The chiral agent is added to nematic liquid crystal so that the liquid crystal can exhibit a cholesteric phase in a room temperature. The wavelength of light selectively reflected by the liquid crystal can be adjusted by altering the content of the chiral agent. According to the present invention, preferably, at least two kinds of chiral agents are used in combination. The use of at least two chiral agents is advantageous in the following points: the necessary volume of chiral agents is smaller; the driving voltage is low; and the reflectance, the color purity and the contrast are improved.

The liquid crystal composition may contain a coloring agent, and in this case, the color purity in the coloring state is improved. Further, it is preferred that an insulating layer is formed on at least one of the substrates on the electrodes. This insulating layer improves the insulation performance and the gas barrier performance. An alignment controlling layer or a color filter may be formed on the inner surface of at least one of the substrates.

Also, a polymeric structure may be provided between the substrates. The polymeric structure is composed of a plurality of columns, such as cylinders, square poles, elliptic cylinders, which may be arranged either at random or in a specified pattern. With the polymeric structure, the gap between the substrates can be maintained stably, the arrangement of the liquid crystal composition becomes stable, and variations in reflectance, etc. can be minimized.

BRIEF DESCRIPTION OF THE DRAWINGS

These and other objects and features of the present invention will be apparent from the following description with reference to the accompanying drawings, in which:

FIG. 4 is a sectional view of a liquid crystal display as the fourth embodiment of the present invention; and FIG. 5 is a sectional view of a liquid crystal display as the fifth embodiment of the present invention.

DETAILED DESCRIPTION OF THE PREFERRED EMBODIMENTS

Embodiments of liquid crystal compositions and liquid crystal displays according to the present invention are described with reference to the accompanying drawings.

First Embodiment; See FIG. 1

Figure 1:
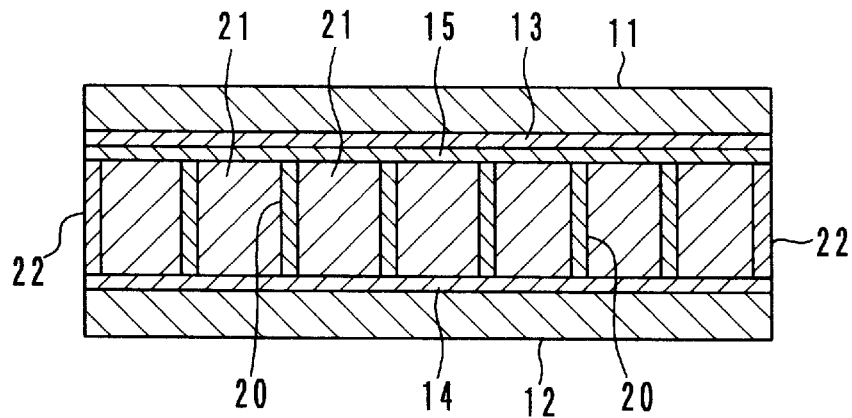
FIG. 1 is a sectional view of a liquid crystal display as the first embodiment of the present invention.

FIG. 1 is a sectional view of a liquid crystal display as the first embodiment of the present invention. The numerals 11 and 12 denote transparent substrates composing a cell, and on the respective surfaces, a plurality of strip-like transparent electrodes 13 and 14 are formed. The electrode strips 13 extend in parallel to one another, and the electrode strips 14 extend in parallel to one another. The extending direction of the electrodes 13 and the extending direction of the electrodes 14 cross each other, and the electrodes 13 and 14 face each other. An insulating layer 15 is coated on the electrodes 13. The numeral 20 is a polymeric structure serving as a space maintaining member, and the numeral 21 is a liquid crystal composition which exhibits a cholesteric phase in a room temperature. The materials of these members and combinations thereof will be described later, and further specific descriptions will be made referring to examples. The numeral 22 is a sealant which is to seal the liquid crystal composition 21 in the cell.

In the liquid crystal display of the above structure, a display is made by application of a pulse voltage to the electrodes 13 and 14. Specifically, because the liquid crystal composition 21 is of a type which exhibits a cholesteric phase, when a pulse voltage with relatively high energy is applied thereto, the liquid crystal comes to a planar state and selectively reflects light of a wavelength determined by the cholesteric pitch and the refractive index. When a pulse voltage with relatively low energy is applied thereto, the liquid crystal comes to a focal-conic state and becomes transparent. Each of the states is maintained even after stoppage of the application of the voltage.

In the liquid crystal display, the intersections of the electrode strips 13 and 14 are display pixels. In the following paragraphs, the area where light modulation is carried out by the liquid crystal is referred to as display area, and the periphery of the display area is a non-display area where light modulation is not carried out.

Substrate

At least one of the substrates 11 and 12 must be transparent. For a transparent substrate, not only glass but also flexible material such as polycarbonate, polyester sulfone, polyethylene terephthalate, etc. can be used.

Electrode

For the electrodes 13 and 14, transparent conductive films typically of ITO (indium tin oxide), metal such as aluminum, silicone, etc., photoconductive films of amolphous silicone, BSO (bismuth silicone oxide) etc. can be used. In order to form the electrodes 13 and 14 in a matrix, for example, an ITO film is formed on each of the substrates 11 and 12 by sputtering, and the ITO film is patterned by photolithography.

Insulating Layer, Alignment Controlling Layer, Color Filter The insulating layer 15 is an inorganic film of e.g. silicone oxide or an organic film of e.g. polyimide resin, epoxy resin, acrylic resin or urethane resin. The insulating layer 15 functions as a preventive of short-circuit between the electrodes 13 and 14 and as a gas barrier layer to improve the reliability of the liquid crystal. If polyimide resin or silicone resin is used, the layer 15 also functions as an alignment controlling layer. In addition, if a coloring agent is added to the layer 15, it will also function as a color filter. Further, the polymeric material which is used for the columnar structure 20 can be also used for the insulating layer 15.

Spacer

Although they are not shown in the drawings, spacers may be provided between the substrates 11 and 12. The spacers are spherical and made of resin or inorganic oxide. The spacers are to maintain the gap between the substrates 11 and 12 even. It is possible to use only the spherical spacers as a space maintaining member without providing the polymeric structure 20.

Liquid Crystal Composition

The liquid crystal composition contains a liquid crystal mixture of which main component is nematic liquid crystal, and by adding a chiral agent to the liquid crystal mixture at an appropriate ratio, the liquid crystal composition is caused to exhibit a cholesteric phase in a room temperature. The wavelength of light to be selectively reflected by the liquid crystal composition can be controlled by changing the content of the chiral agent in the liquid crystal composition. Further, a coloring agent may be added. The liquid crystal mixture contains a liquid crystal phenylcyclohexane compound at approximately 45 to 60 wt % and a liquid crystal tolan compound at 5 to 15 wt %. Additionally, the liquid crystal mixture may contain a polycyclic compound to raise the transition temperature to isotropic phase and may contain other liquid crystal components such as N-type compounds.

The following general chemical formula (G) and specific chemical formulas ($G_1$) through ($G_{82}$) show usable liquid crystal phenylcyclohexane compounds.

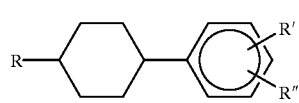
(G)

R: alkyl or alkoxyl with one to ten carbons
R', R": alkyl or alkoxyl with one to ten carbons, cyano, halogen or hydrogen

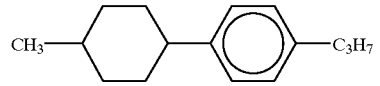
($G_1$)

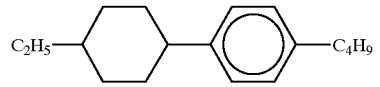
($G_2$)

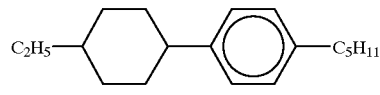
($G_3$)

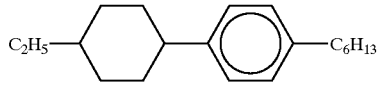
($G_4$)

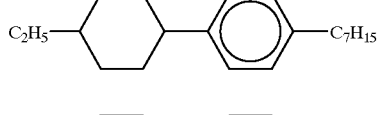
($G_5$)

($G_6$)

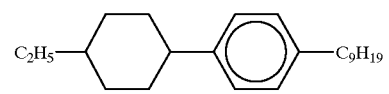 (G7)
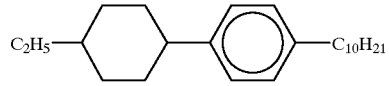 (G8)
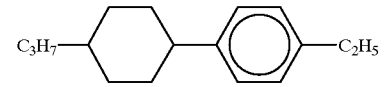 (G9)
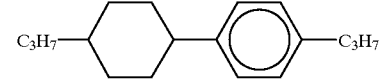 (G10)
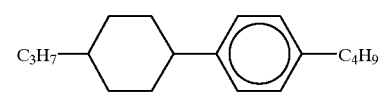 (G11)
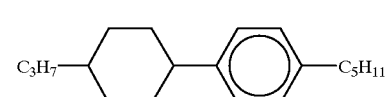 (G12)
 (G13)
 (G14)
 (G15)
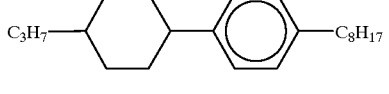 (G16)
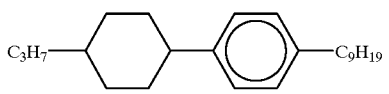 (G17)
 (G18)
 (G19)
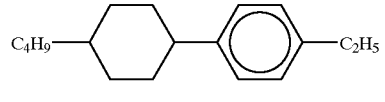 (G20)
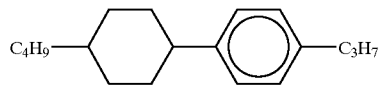 
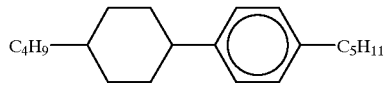 (G21)
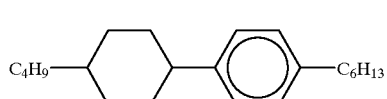 (G22)
 (G23)
 (G24)
 (G25)
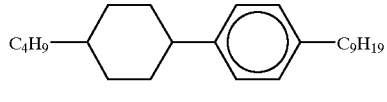 (G26)
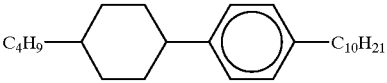 (G27)
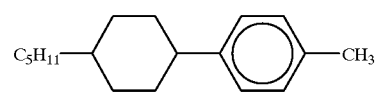 (G28)
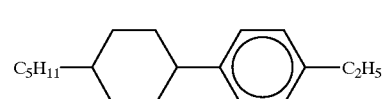 (G29)
 (G30)
 (G31)
 (G32)
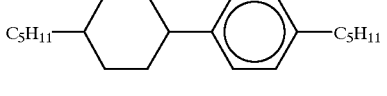 (G33)
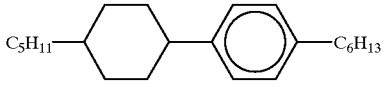 (G34)

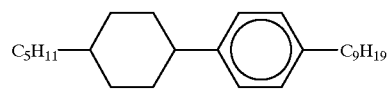 (G35)
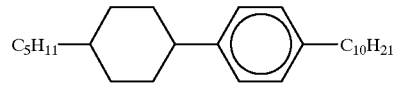 (G36)
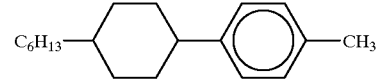 (G37)
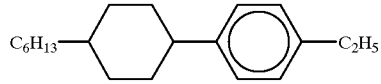 (G38)
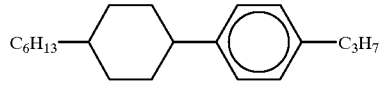 (G39)
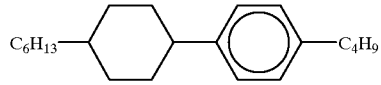 (G40)
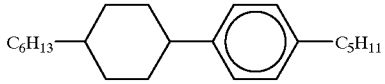 (G41)
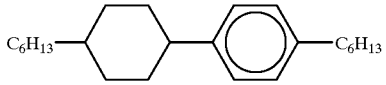 (G42)
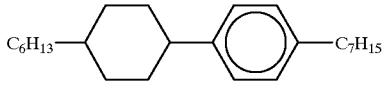 (G43)
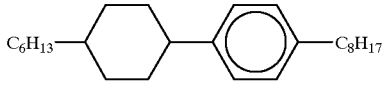 (G44)
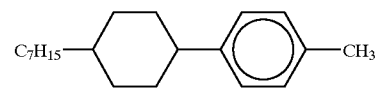 (G45)
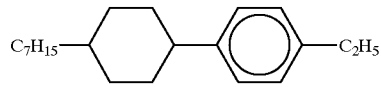 (G46)
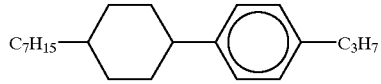 (G47)
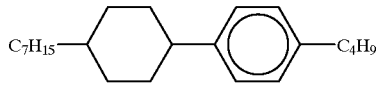 (G48)
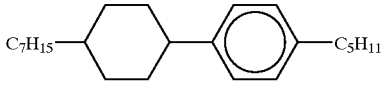 (G49)
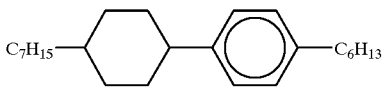 (G50)
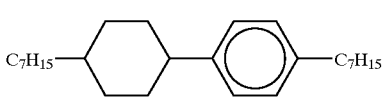 (G51)
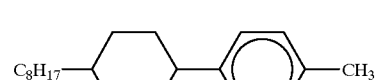 (G52)
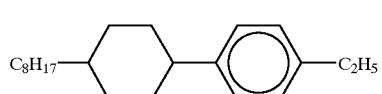 (G53)
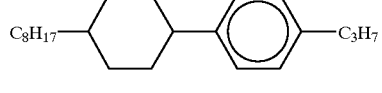 (G54)
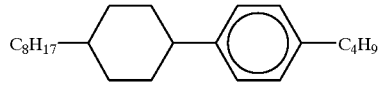 (G55)
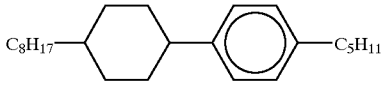 (G56)
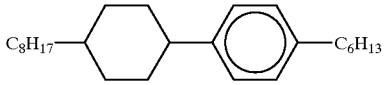 (G57)
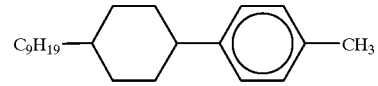 (G58)
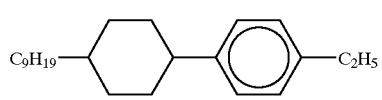 (G59)
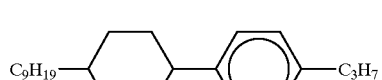 (G60)
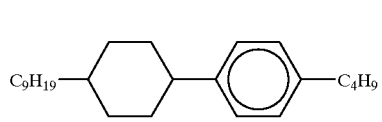 (G61)

(G62) 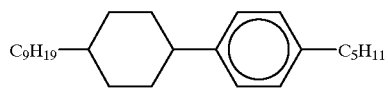
(G63) 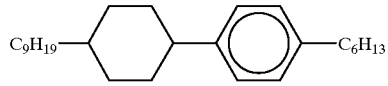
(G64) 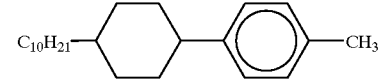
(G65) 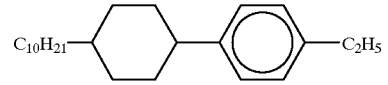
(G66) 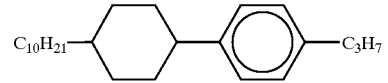
(G67) 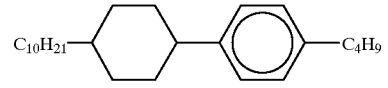
(G68) 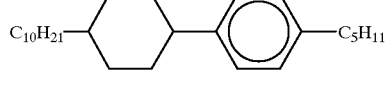
(G69) 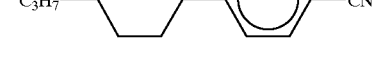
(G70) 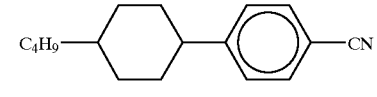
(G71) 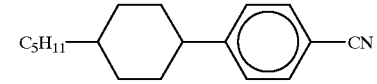
(G72) 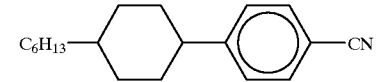
(G73) 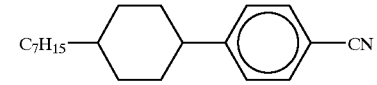
(G74) 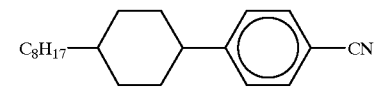
(G75) 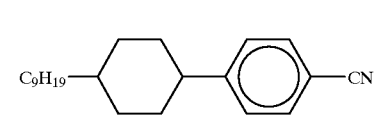

(G76) 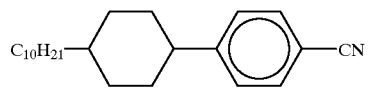
(G77) 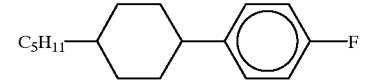
(G78) 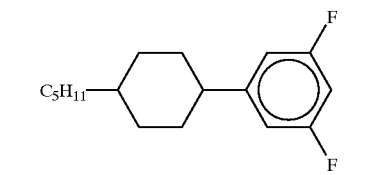
(G79) 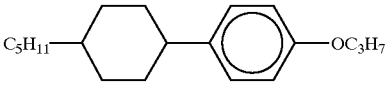
(G80) 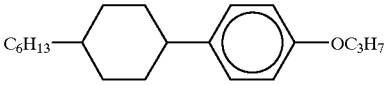
(G81) 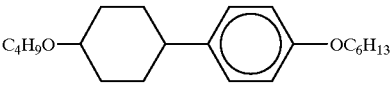
(G82) 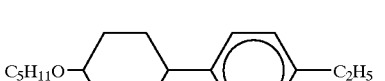

The following general chemical formula (H) and specific chemical formulas ($H_1$) to ($H_{50}$) show usable liquid crystal tolan compounds.

(H) 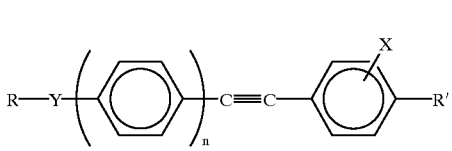

R: alkyl with one to ten carbons
Y: cyclohexane ring or single bond
X: halogen or hydrogen
n: 1 or 2
R': alkyl with one to ten carbons, halogen
    or the group shown by the following chemical formula

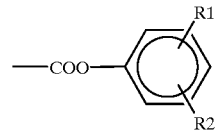

R1, R2: hydrogen, halogen or alkyl with one to ten carbons ($H_1$) 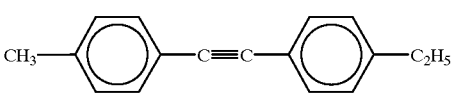

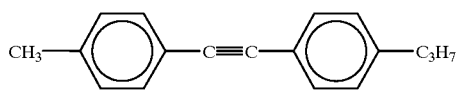 (H2)
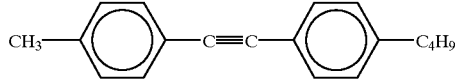 (H3)
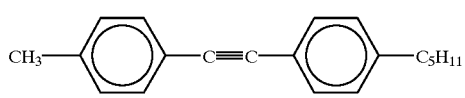 (H4)
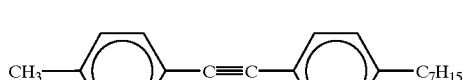 (H5)
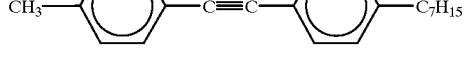 (H6)
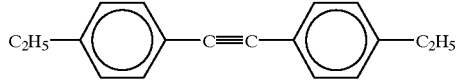 (H7)
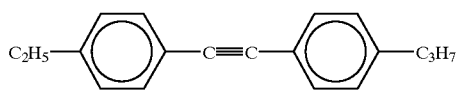 (H8)
 (H9)
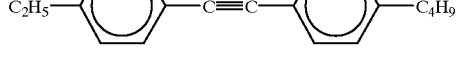 (H10)
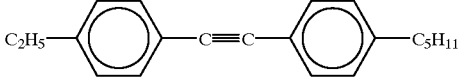 (H11)
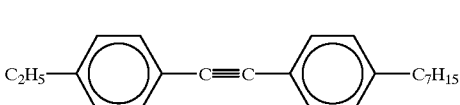 (H12)
 (H13)
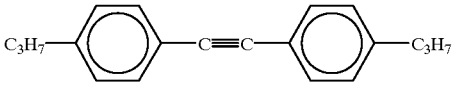 (H14)
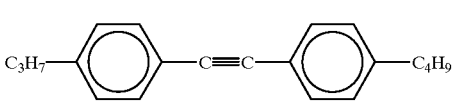 (H15)
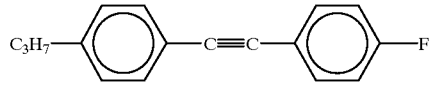 (H16)
 (H17)
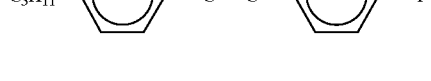 (H18)
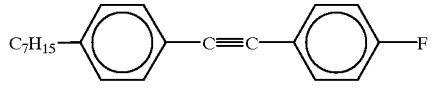 (H19)
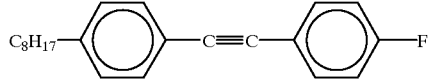 (H20)
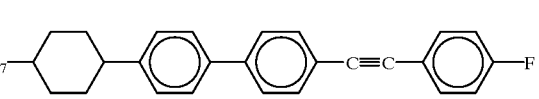 (H21)
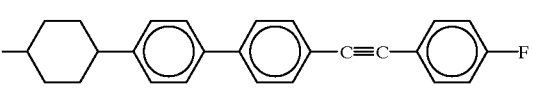 (H22)
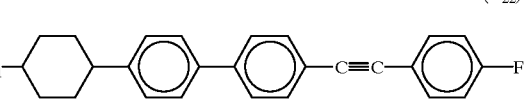 (H23)
 (H24)
 (H25)
 (H26)
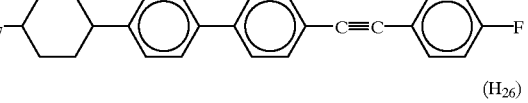 (H27)
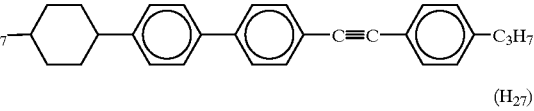 (H28)

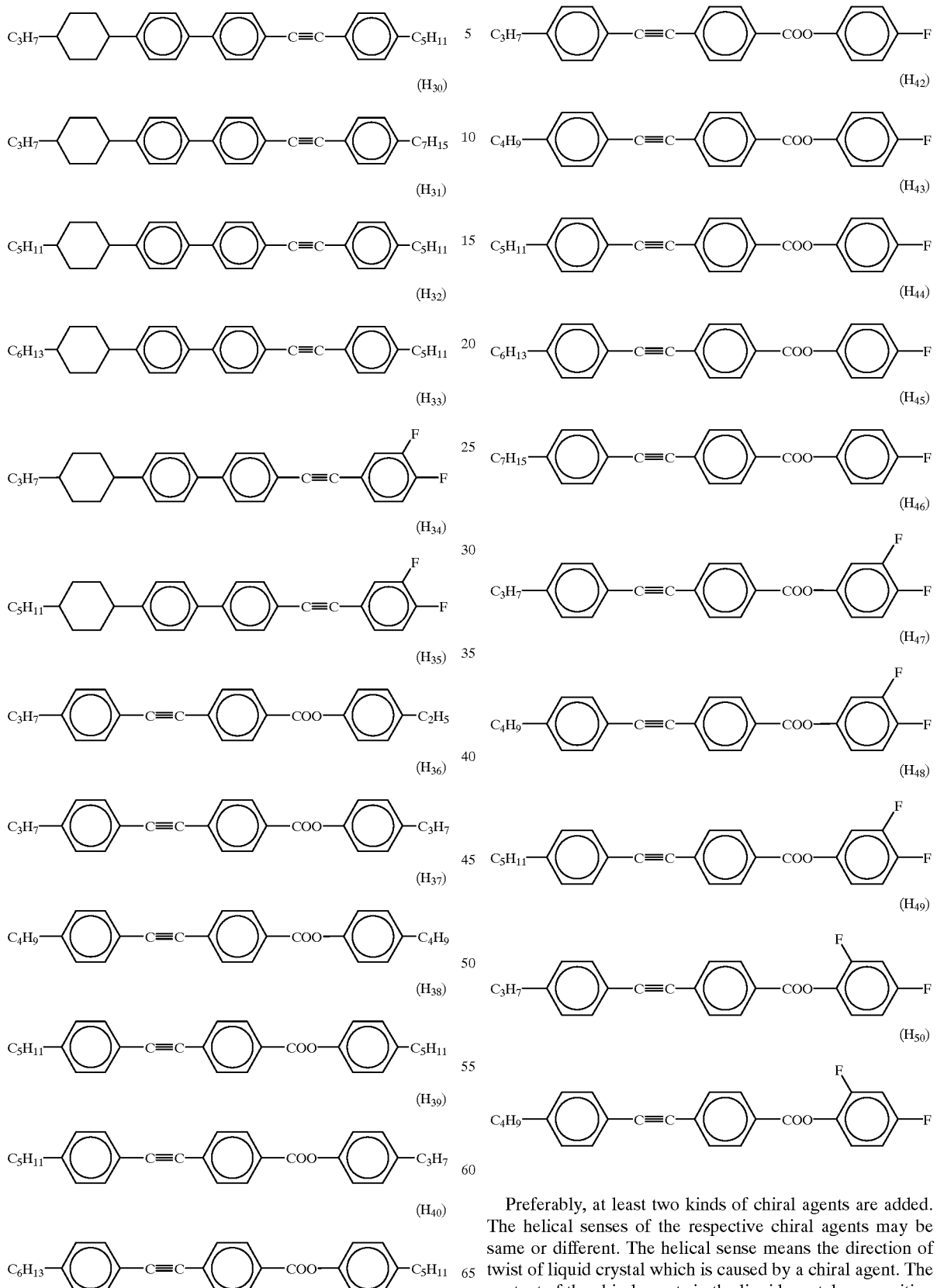
Preferably, at least two kinds of chiral agents are added. The helical senses of the respective chiral agents may be same or different. The helical sense means the direction of twist of liquid crystal which is caused by a chiral agent. The content of the chiral agents in the liquid crystal composition is preferably not more than approximately 30 wt %. If the content of the chiral agents is more than 30 wt %, there arise a problem that a higher driving voltage is necessary. The following general chemical formulas (A) through (F) and specific chemical formulas $(A_1)$ through $(A_{10})$, $(B_1)$ through $(B_{10})$, $(C_1)$ through $(C_{10})$, $(D_1)$ through $(D_{10})$, $(E_1)$ through $(E_{10})$ and $(F_1)$ through $(F_9)$ show usable chiral agents.

(A)

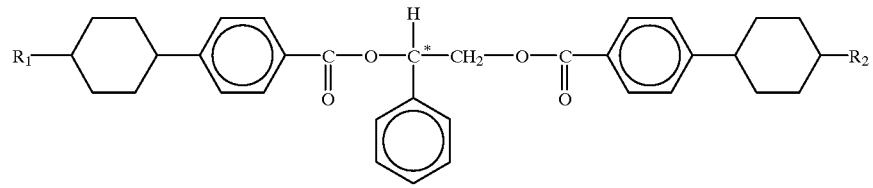

R1, R2: alkyl or alkoxyl with one to ten carbons $(A_1)$

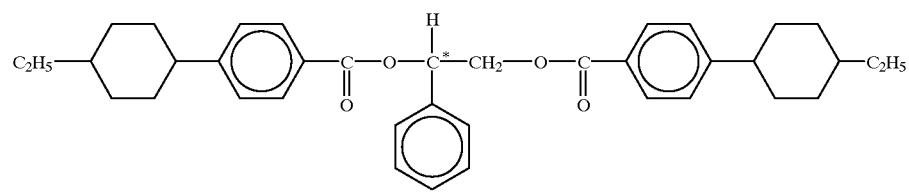

$(A_2)$

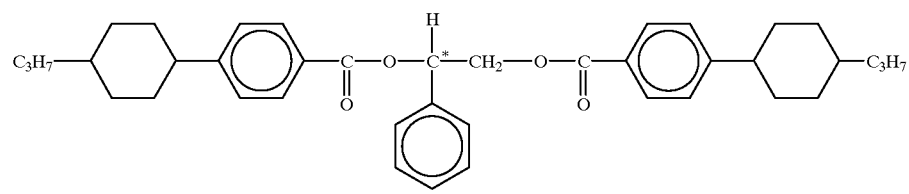

$(A_3)$

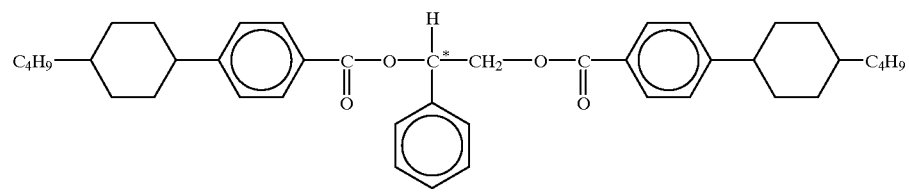

$(A_4)$

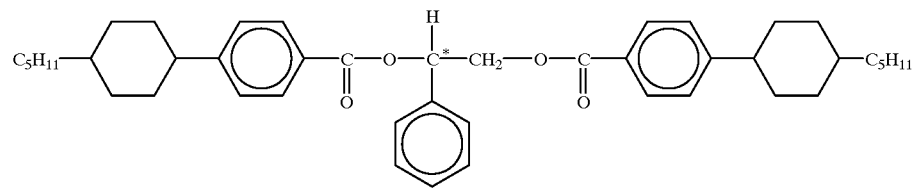

$(A_5)$

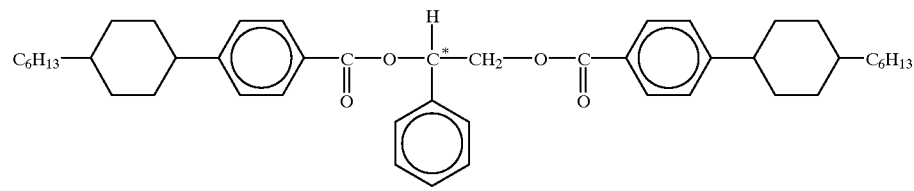

-continued
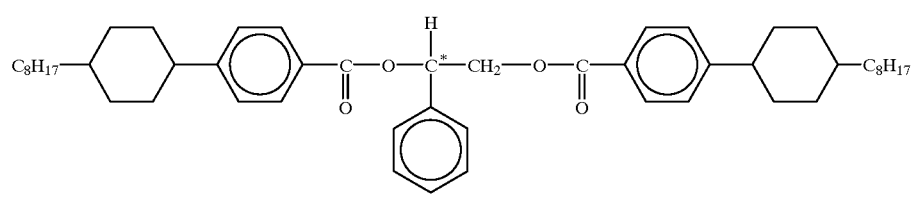
(A6)
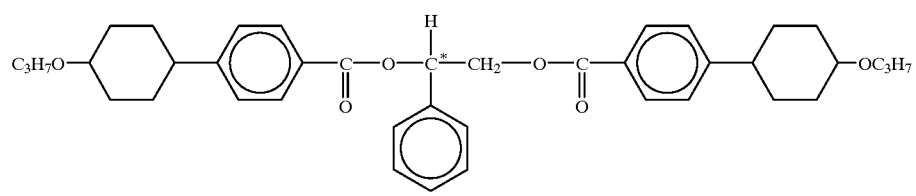
(A7)
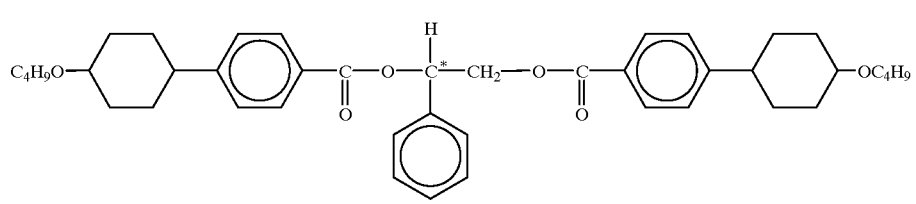
(A8)
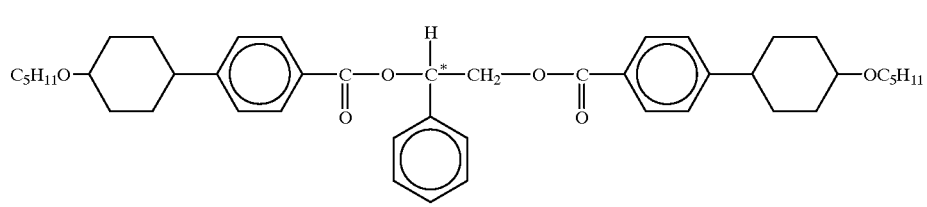
(A9)
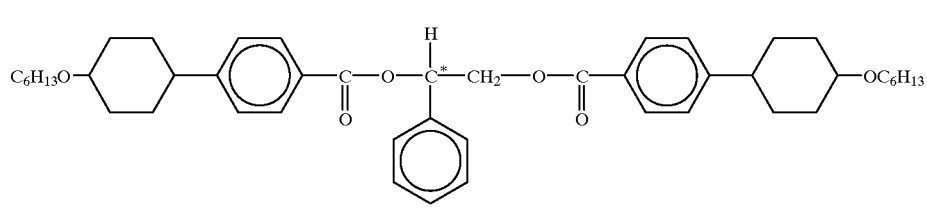
(A10)
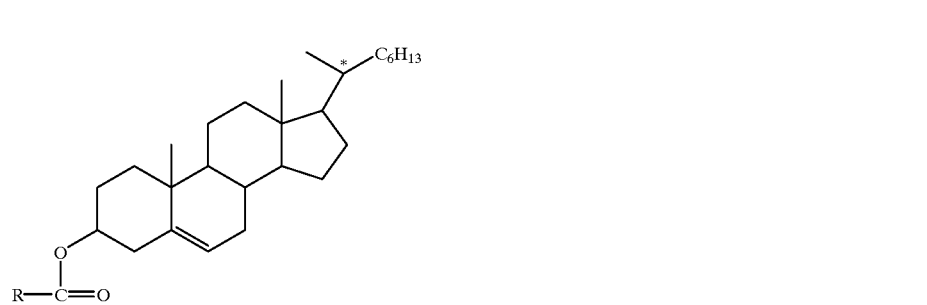
(B)
R: alkyl with one to ten carbons -continued
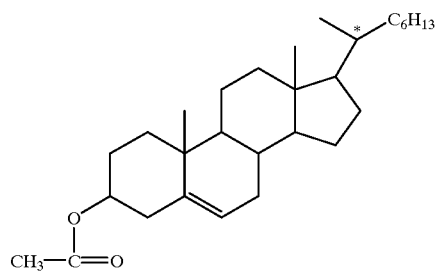
(B₁)
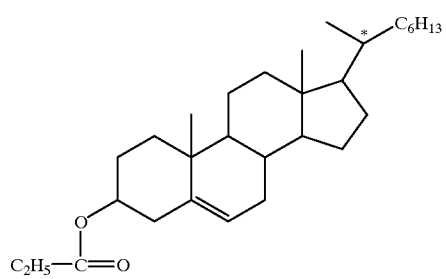
(B₂)
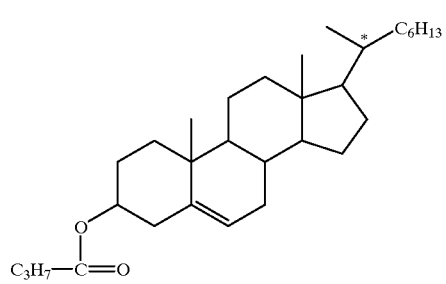
(B₃)
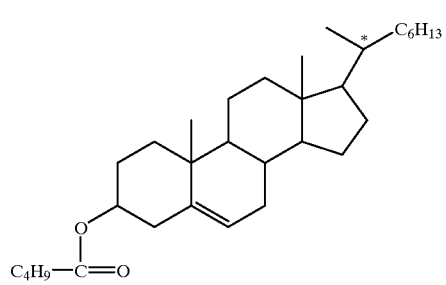
(B₄)
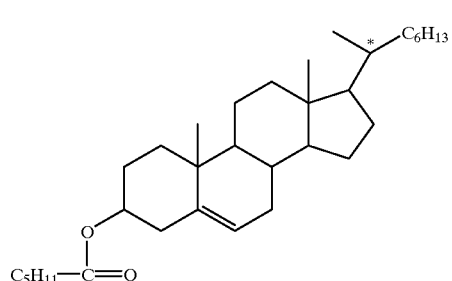
(B₅)

-continued
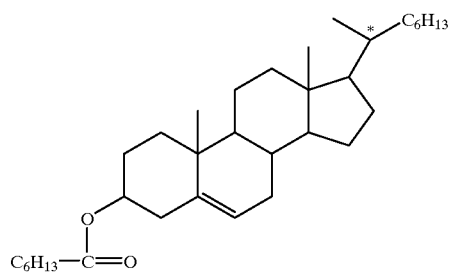
(B6)
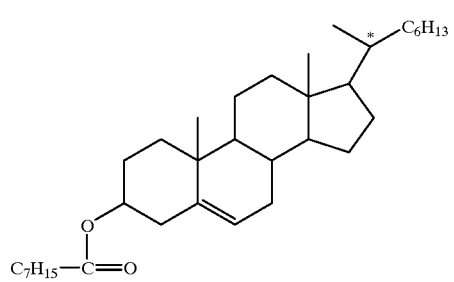
(B7)
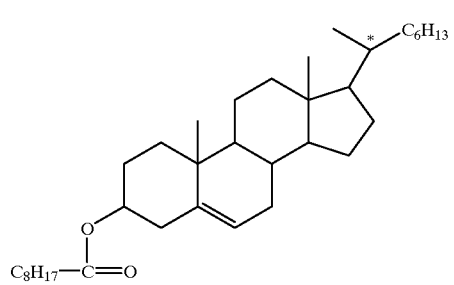
(B8)
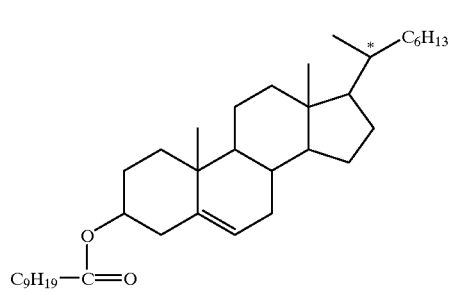
(B9)
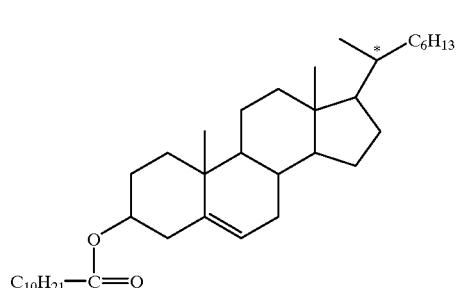
(B10)
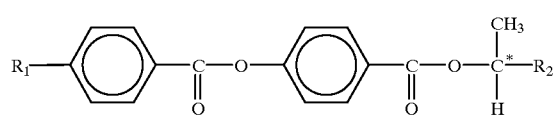
(C)
$R_1$: alkyl or alkoxyl with one to ten carbons
$R_2$: alkyl with two to ten carbons -continued
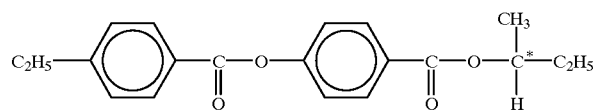
(C₁)
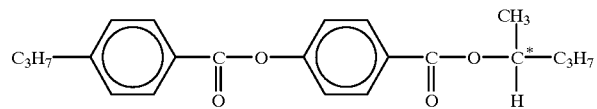
(C₂)
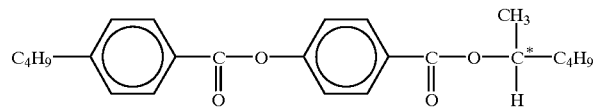
(C₃)
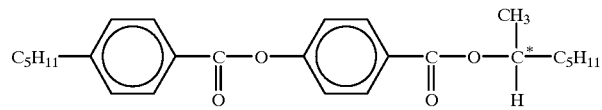
(C₄)
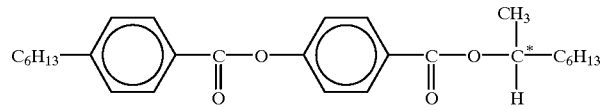
(C₅)
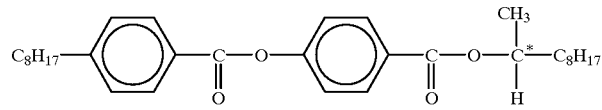
(C₆)
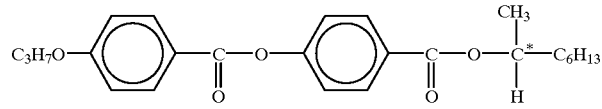
(C₇)
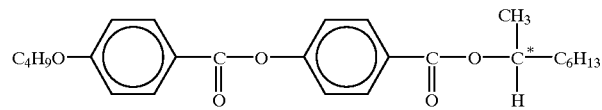
(C₈)
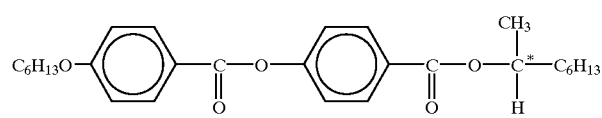
(C₉)
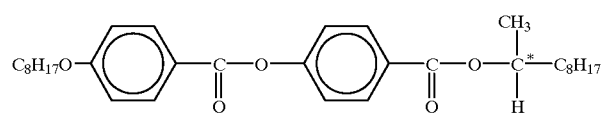
(C₁₀)

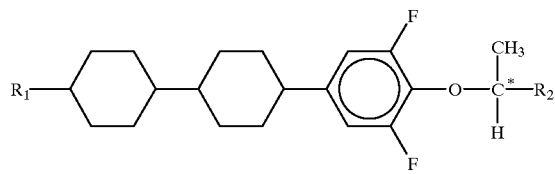
R₁: alkyl or alkoxyl with one to ten carbons
R₂: alkyl with two to ten carbons
(D)
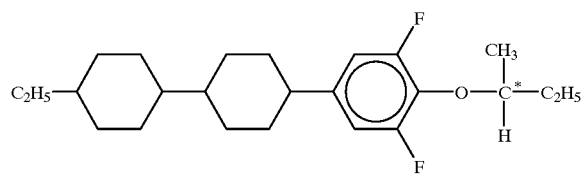
(D₁)
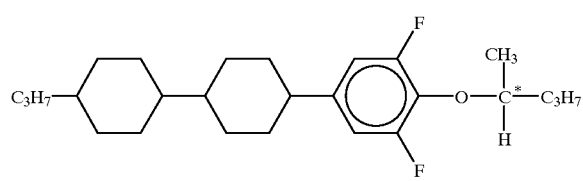
(D₂)
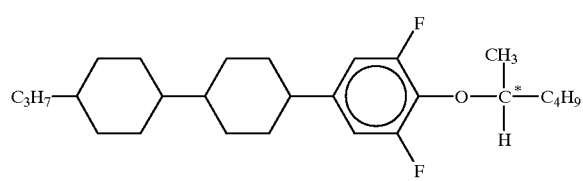
(D₃)
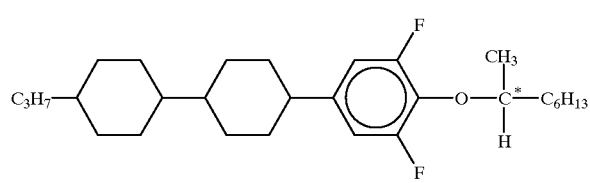
(D₄)
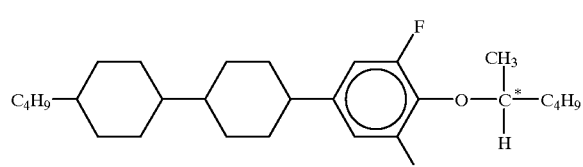
(D₅)
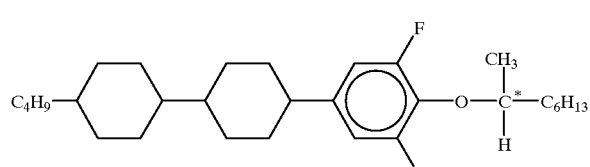
(D₆)
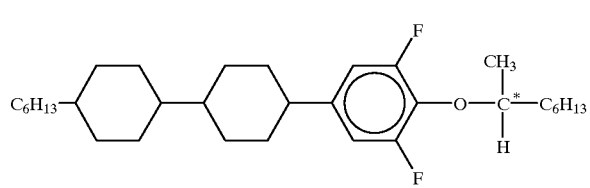
(D₇)

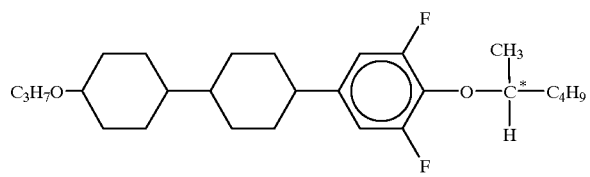 (D8)
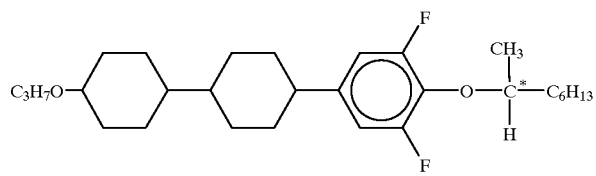 (D9)
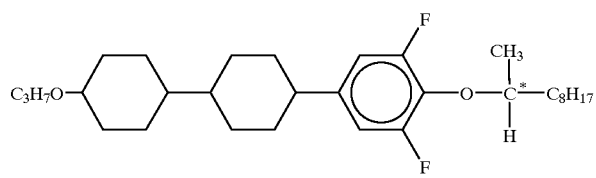 (D10)
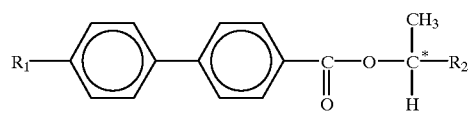 (E)
R₁: alkyl or alkoxyl with one to ten carbons
R₂: alkyl with two to ten carbons
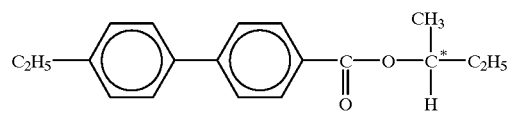 (E1)
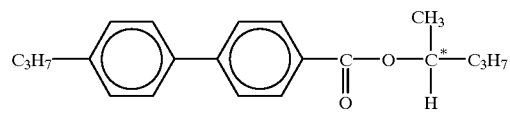 (E2)
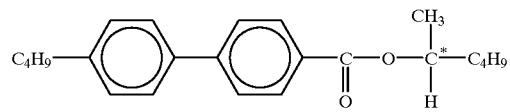 (E3)
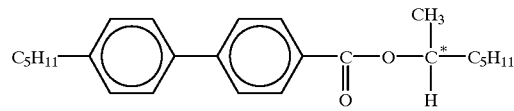 (E4)
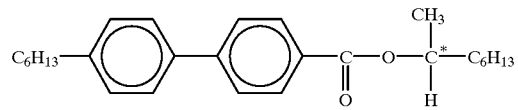 (E5)
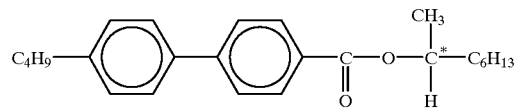 (E6)

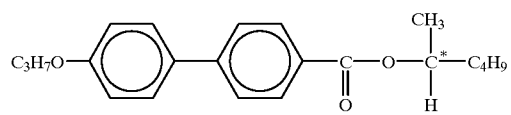 (E7)
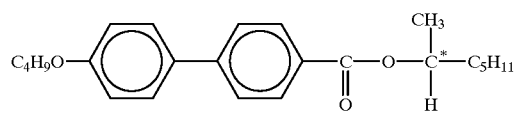 (E8)
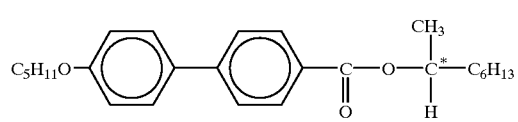 (E9)
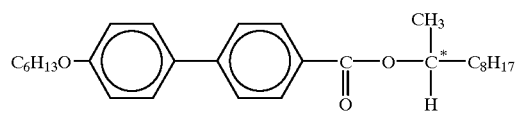 (E10)
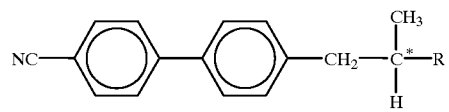 (F)
R: alkyl with two to ten carbons
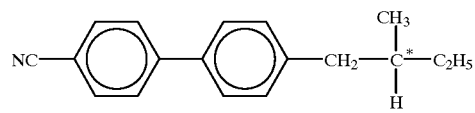 (F1)
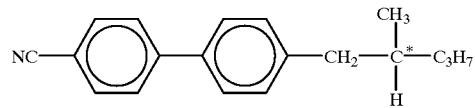 (F2)
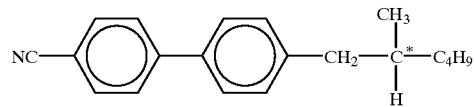 (F3)
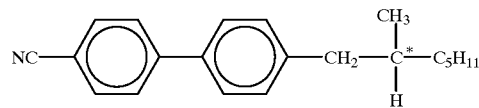 (F4)
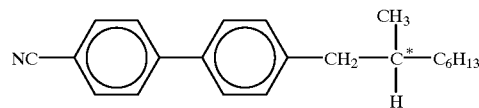 (F5)
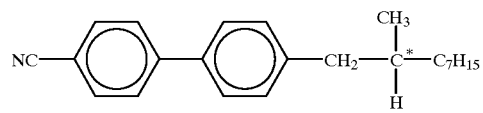 (F6)
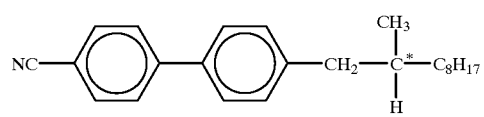 (F7)

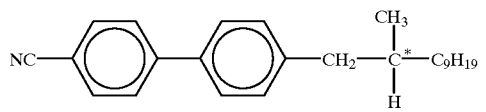

(F8)

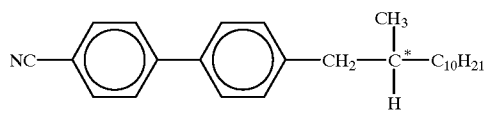

(F9)

As the coloring agent to be added, various well-known coloring agents such as azo compounds, quinone compounds, anthraquinone compounds and dichroic dyes can be used, and two or more of these coloring agents may be added. The content of the coloring agent(s) is preferably not more than 3 wt %.

Polymeric Structure

First, the configuration of the polymeric structure 20 is described.

The polymeric structure 20 is composed of columns, for example, cylinders, square poles or elliptic cylinders which are arranged at regular intervals in a specified pattern such as a grating or stripes. Preferably, the arrangement of the columns is not random. For example, the columns may be arranged at uniform intervals, at gradually changing intervals, in periodically repeating specified patterns or the like. The arrangement is preferably such a type which enables the substrates 11 and 12 to keep a suitable gap between each other and will never be obstructive to image display.

Next, the material is described. The polymeric structure 20 is made of a polymeric composition which is produced by adding a polymerization initiator to polymeric monomer. The polymeric composition is, for example, photosetting resin in the market which is produced by mixing photosetting monomer or oligomer with a photopolymerization initiator. A photopolymerization method in which light is radiated to photosetting resin facilitates the columnar structure to be formed in a desired pattern. Materials of which main components are acrylic ester compounds are especially suited for such a polymeric structure. An acrylic ester compound is an acrylate compound or a methacrylate compound which has two or more allyl groups. It may contain an aromatic ring or the like in the main chain between the allyl groups. Also, it may contain a divalent group such as CO, $CO_2$, $CH_2$, O or the like in the main chain. Further, epoxy acrylate compounds, urethane acrylate compounds, etc. are included in acrylate compounds.

The polymeric structure 20 can be formed in any well-known method. For example, the following way is possible: photosetting resin is coated on one of the substrates; a light of a specified wavelength is radiated to the photosetting resin via a mask with an opening of a specified pattern so as to polymerize the photosetting resin; and the photosetting resin is removed from unnecessary portions. The following method is also possible: a mixture of the liquid crystal composition and photosetting resin is coated on one of the substrates; the other substrates is laid thereon; and light of a specified wavelength is radiated via a mask with an opening of a specified pattern so as to polymerize the photosetting resin and separate the mixture into liquid crystal and resin.

Also, the polymeric structure 20 may be made of thermoplastic resin, and more specifically, a resin material which is prepared by dissolving thermoplastic resin by a solvent is used. In this case, a printing method wherein thermoplastic resin is pushed out on a substrate by a squeegee via a screen or a mask, a dispenser method, an ink jet method, etc. wherein resin is dispensed on a substrate through the end of a nozzle, a transfer method wherein resin is supplied to a plate or a roller and thereafter transferred to the surface of a substrate, and other methods can be adopted. Thereafter, the liquid crystal composition is filled between substrates with the polymeric structure in-between by a vacuum injection method.

Sealant

The sealant 22 is to prevent the liquid crystal composition 21 from leaking from the substrates 11 and 12. Epoxy resin, acrylic resin, thermosetting resin, photosetting adhesives, etc. can be used as the sealant 22.

Structure of the Second Embodiment

Figure 2:
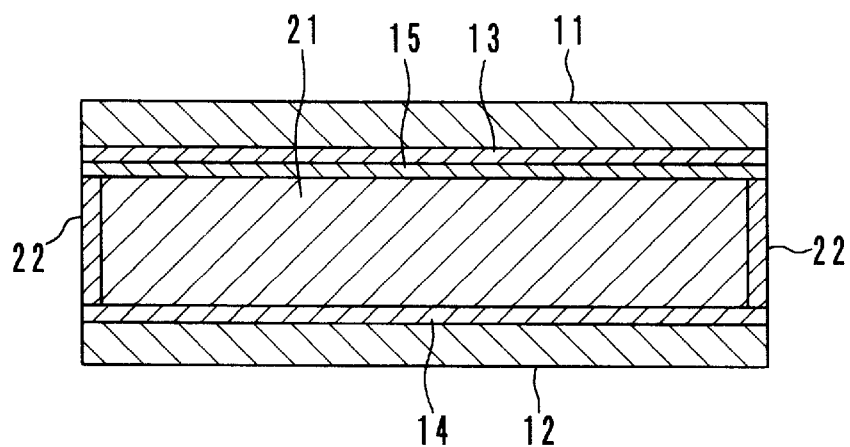
FIG. 2 is a sectional view of a liquid crystal display as the second embodiment of the present invention.

FIG. 2 is a sectional view of a liquid crystal display as the second embodiment of the present invention. This liquid crystal display is basically of the same structure as the first embodiment shown by FIG. 1. In the second embodiment, the polymeric structure is not provided in the display area. In FIG. 2, the same members are provided with the same reference symbols as in FIG. 1.

Third Embodiment; See FIG. 3

Figure 3:
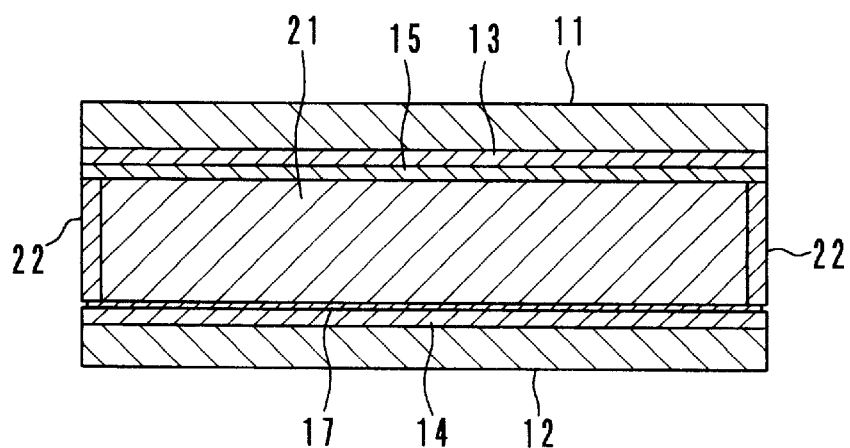
FIG. 3 is a sectional view of a liquid crystal display as the third embodiment of the present invention.

FIG. 3 is a sectional view of a liquid crystal display as the third embodiment of the present invention. This liquid crystal display is of the same structure as the second embodiment which does not have a polymeric structure, and in the third embodiment, an alignment controlling layer 17 is formed on the electrodes 14 of the substrate 12. In FIG. 3, the same members are provided with the same reference symbols as in FIG. 2.

Fourth Embodiment; See FIG. 4

FIG. 4 is a sectional view of a liquid crystal display as the fourth embodiment of the present invention. This liquid crystal display is basically of the same structure as the third embodiment, and the fourth embodiment further has an alignment controlling layer 16 on the insulating layer 15 on the substrate 11 as well as the alignment controlling layer 17. In FIG. 4, the same members are provided with the same reference symbols as in FIG. 3.

Fifth Embodiment; See FIG. 5

FIG. 5 is a sectional view of a liquid crystal display as the fifth embodiment of the present invention. This liquid crystal display is basically of the same structure as the second embodiment, and a color filter 18 is provided on the electrodes 14 on the substrate 12. In FIG. 5, the same members are provided with the same reference symbols as in FIG. 2.

EXPERIMENTAL EXAMPLE 1

To nematic liquid crystal which contains a mixture of the liquid crystal phenylcyclohexane compounds of the chemical formulas ($G_3$), ($G_{15}$) and ($G_{38}$) at 50 wt %, a mixture of the liquid crystal tolan compounds of the chemical formulas ($H_5$), ($H_{20}$) and ($H_{40}$) at 12 wt %, a tricyclic compound at 22 wt % and an N-type compound at 16 wt %, the chiral agents of the chemical formulas ($A_1$) and ($E_2$) were added at 25 wt % so that the liquid crystal would selectively reflect light of around 560 nm. Further, a coloring agent Kayaset Yellow GN (made by Nippon Kayaku Co., Ltd.) was added at 0.5 wt %, and thus, a liquid crystal composition was prepared.

With respect to the nematic liquid crystal, the anisotropy of refractive index was 0.17; the anisotropy of dielectric constant was 10.0; and the phase transition temperature to isotropic phase was 85° C. The liquid crystal composition was filled in a cell of the structure shown by FIG. 2. The gap of the cell was 7 $\mu$m, and as the insulating layer, acrylic resin is formed into a membrane with a thickness of 1000 Å.

In the liquid crystal display, when a pulse voltage of 80V was applied between the electrodes for three milliseconds, the liquid crystal came to a planar state (showed green). At that time the Y value was 21.0. When a pulse voltage of 40V was applied for three milliseconds, the liquid crystal came to a focal-conic state (transparent), and the Y value was 2.2. Accordingly, the contrast was 9.5. With respect to this liquid crystal display, the contrast was high, the responsibility was good, and a drive by a low voltage was possible.

The Y value (luminous reflectance) was measured by use of a spectrocolorimeter CM-3700d (made by Minolta Co., Ltd.) which has a white light source. In the experimental examples and comparative examples below, the same spectrocolorimeter was used.

EXPERIMENTAL EXAMPLE 2

To nematic liquid crystal which contains a mixture of the liquid crystal phenylcyclohexane compounds of the chemical formulas ($G_2$), ($G_5$) and ($G_{10}$) at 50 wt %, a mixture of the liquid crystal tolan compounds of the chemical formulas ($H_4$), ($H_{18}$) and ($H_{50}$) at 12 wt %, a tricyclic compound at 22 wt % and an N-type compound at 16 wt %, the chiral agents of the chemical formulas ($A_1$) and ($E_2$) were added at 25 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.17; the anisotropy of dielectric constant was 10.0; and the phase transition temperature to isotropic phase was 87° C. The liquid crystal composition was filled in a cell of the structure shown by FIG. 2. The gap of the cell was 7 $\mu$m, and as the insulating layer, acrylic resin is formed into a membrane with a thickness of 1000 Å.

In the liquid crystal display, when a pulse voltage of 80V was applied between the electrodes for three milliseconds, the liquid crystal came to a planar state (showed green). At that time the Y value was 20.0. When a pulse voltage of 40V was applied for three milliseconds, the liquid crystal came to a focal-conic state (transparent), and the Y value was 2.1. Accordingly, the contrast was 9.5. With respect to this liquid crystal display, the contrast was high, the responsibility was good, and a drive by a low voltage was possible.

EXPERIMENTAL EXAMPLE 3

To nematic liquid crystal which contains a mixture of the liquid crystal phenylcyclohexane compounds of the chemical formulas ($G_2$), ($G_5$) and ($G_{10}$) at 55 wt %, a mixture of the liquid crystal tolan compounds of the chemical formulas ($H_4$), ($H_{18}$) and ($H_{50}$) at 9 wt %, a tricyclic compound at 22 wt % and an N-type compound at 14 wt %, the chiral agents of the chemical formulas ($A_1$) and ($E_2$) were added at 26 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.18; the anisotropy of dielectric constant was 9.0; and the phase transition temperature to isotropic phase was 88° C. The liquid crystal composition was filled in a cell of the structure shown by FIG. 2. The gap of the cell was 7 $\mu$m, and as the insulating layer, acrylic resin is formed into a membrane with a thickness of 1000 Å.

In the liquid crystal display, when a pulse voltage of 80V was applied between the electrodes for three milliseconds, the liquid crystal came to a planar state (showed green). At that time the Y value was 22.0. When a pulse voltage of 40V was applied for three milliseconds, the liquid crystal came to a focal-conic state (transparent), and the Y value was 2.0. Accordingly, the contrast was 11.0. With respect to this liquid crystal display, the contrast was high, the responsibility was good, and a drive by a low voltage was possible.

EXPERIMENTAL EXAMPLE 4

To nematic liquid crystal which contains a mixture of the liquid crystal phenylcyclohexane compounds of the chemical formulas ($G_2$), ($G_5$) and ($G_{10}$) at 55 wt %, a mixture of the liquid crystal tolan compounds of the chemical formulas ($H_4$), ($H_{18}$) and ($H_{50}$) at 9 wt %, a tricyclic compound at 22 wt % and an N-type compound at 14 wt %, the chiral agents of the chemical formulas ($A_3$) and ($F_3$) were added at 24 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.16; the anisotropy of dielectric constant was 10.0; and the phase transition temperature to isotropic phase was 85° C. The liquid crystal composition was filled in a cell of the structure shown by FIG. 2. The gap of the cell was 7 $\mu$m, and as the insulating layer, acrylic resin is formed into a membrane with a thickness of 1000 Å.

In the liquid crystal display, when a pulse voltage of 80V was applied between the electrodes for three milliseconds, the liquid crystal came to a planar state (showed green). At that time the Y value was 20.0. When a pulse voltage of 40V was applied for three milliseconds, the liquid crystal came to a focal-conic state (transparent), and the Y value was 2.2. Accordingly, the contrast was 9.1. With respect to this liquid crystal display, the contrast was high, the responsibility was good, and a drive by a low voltage was possible.

COMPARATIVE EXAMPLE 1

To nematic liquid crystal which contains a mixture of the liquid crystal phenylcyclohexane compounds of the chemical formulas ($G_2$), ($G_5$) and ($G_{10}$) at 50 wt %, a mixture of the liquid crystal tolan compounds of the chemical formulas ($H_4$), ($H_{18}$) and ($H_{50}$) at 2 wt %, a tricyclic compound at 22 wt % and an N-type compound at 26 wt %, the chiral agents of the chemical formulas ($A_3$) and ($F_3$) were added at 26 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.13; the anisotropy of dielectric constant was 10.0; and the phase transition temperature to isotropic phase was 88° C. The liquid crystal composition was filled in the cell shown by FIG. 2. The gap of the cell was 7 µm, and as the insulating layer, acrylic resin is formed into a membrane with a thickness of 1000 Å.

In the liquid crystal display, when a pulse voltage of 80V was applied between the electrodes for three milliseconds, the liquid crystal came to a planar state (showed green). At that time the Y value was 15.0. When a pulse voltage of 40V was applied for three milliseconds, the liquid crystal came to a focal-conic state (transparent), and the Y value was 2.8. acordingly, the contrast was 5.3. With respect to this liquid crystal display, the contrast was lower.

COMPARATIVE EXAMPLE 2

To nematic liquid crystal which contains a mixture of the liquid crystal phenylcyclohexane compounds of the chemical formulas ($G_2$), ($G_5$) and ($G_{10}$) at 40 wt %, a mixture of the liquid crystal tolan compounds of the chemical formulas ($H_4$), ($H_{18}$) and ($H_{50}$) at 10 wt %, a tricyclic compound at 22 wt % and an N-type compound at 28 wt %, the chiral agents of the chemical formulas ($A_3$) and ($F_3$) were added at 24 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.19; the anisotropy of dielectric constant was 7.0; and the phase transition temperature to isotropic phase was 85° C. The liquid crystal composition was filled in a cell of the structure shown by FIG. 2. The gap of the cell was 7 µm, and as the insulating layer, acrylic resin is formed into a membrane with a thickness of 1000 Å.

In the liquid crystal display, when a pulse voltage of 120V was applied between the electrodes for three milliseconds, the liquid crystal came to a planar state (showed green). At that time the Y value was 20.0. When a pulse voltage of 60V was applied for three milliseconds, the liquid crystal came to a focal-conic state (transparent), and the Y value was 4.0. Accordingly, the contrast was 5.0. With respect to this liquid crystal display, the contrast was lower, and a higher driving voltage was necessary.

COMPARATIVE EXAMPLE 3

To nematic liquid crystal which contains a mixture of the liquid crystal phenylcyclohexane compounds of the chemical formulas ($G_2$), ($G_5$) and ($G_{10}$) at 35 wt %, a mixture of the liquid crystal tolan compounds of the chemical formulas ($H_4$), ($H_{18}$) and ($H_{50}$) at 3 wt %, a tricyclic compound at 30 wt % and an N-type compound at 32 wt %, the chiral agents of the chemical formulas ($A_3$) and ($F_3$) were added at 28 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.13; the anisotropy of dielectric constant was 6.0; and the phase transition temperature to isotropic phase was 88° C. The liquid crystal composition was filled in a cell of the structure shown by FIG. 2. The gap of the cell was 7 µm, and as the insulating layer, acrylic resin is formed into a membrane with a thickness of 1000 Å.

In the liquid crystal display, when a pulse voltage of 130V was applied between the electrodes for ten milliseconds, the liquid crystal came to a planar state (showed green). At that time the Y value was 15.0. When a pulse voltage of 70V was applied for three milliseconds, the liquid crystal came to a focal-conic state (transparent), and the Y value was 2.8. Accordingly, the contrast was 5.4. With respect to this liquid crystal display, the contrast and the responsibility were lower, and a higher driving voltage was necessary.

EXPERIMENTAL EXAMPLE 5

To nematic liquid crystal which contains a mixture of the liquid crystal phenylcyclohexane compounds of the chemical formulas ($G_3$), ($G_{15}$) and ($G_{38}$) at 55 wt %, a mixture of the liquid crystal tolan compounds of the chemical formulas ($H_5$), ($H_{20}$) and ($H_{40}$) at 9 wt %, a tricyclic compound at 22 wt % and an N-type compound at 14 wt %, the chiral agents of the chemical formulas ($A_5$), ($D_3$) and ($E_5$) were added at 24 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.16; the anisotropy of dielectric constant was 10.0; and the phase transition temperature to isotropic phase was 85° C. The liquid crystal composition was filled in a cell of the structure shown by FIG. 2. The gap of the cell was 7 µm, and as the insulating layer, acrylic resin is formed into a membrane with a thickness of 1000 Å.

In the liquid crystal display, when a pulse voltage of 80V was applied between the electrodes for three milliseconds, the liquid crystal came to a planar state (showed green). At that time the Y value was 20.0. When a pulse voltage of 40V was applied for three milliseconds, the liquid crystal came to a focal conic state (transparent), and the Y value was 2.2. Accordingly, the contrast was 9.1. With respect to this liquid crystal display, the contrast was high, the responsibility was good, and a drive by a low voltage was possible.

EXPERIMENTAL EXAMPLE 6

To nematic liquid crystal which contains a mixture of the liquid crystal phenylcyclohexane compounds of the chemical formulas ($G_3$), ($G_{15}$) and ($G_{38}$) at 55 wt %, a mixture of the liquid crystal tolan compounds of the chemical formulas ($H_5$), ($H_{20}$) and ($H_{40}$) at 9 wt %, a tricyclic compound at 22 wt % and an N-type compound at 14 wt %, the chiral agents of the chemical formulas ($B_4$) and ($C_7$) were added at 24 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.16; the anisotropy of dielectric constant was 10.0; and the phase transition temperature to isotropic phase was 85° C. The liquid crystal composition was filled in a cell of the structure shown by FIG. 1. More specifically, the cell was fabricated in the following way: resin spacer particles with a diameter of 7 µm in a specified amount were dispersed on a substrate with transparent electrodes thereon; a specified volume of acrylic monomer R684 (made by Nippon Kayaku Co., Ltd.) which contains a photopolymerization initiator at 5 wt % was dropped on the substrate; a photomask which has openings of 50×50 μm at intervals of 50 μm was covered thereon; ultraviolet rays were radiated with the photomask pressed by a specified load; thereafter, the photomask was removed; the unhardened portion of the acrylic monomer was cleaned off by ethanol; thus, a columnar structure with columns of 50×50 μm at intervals of 50 μm was structured in the display area; a substrate with transparent electrodes thereon and a sealant on the periphery was pressed against the substrate with the columnar structure while the substrates were heated, whereby the substrates were joined together as the sealant was hardened. As the insulating layer, acrylic resin was formed into a membrane with a thickness of 1000 Å.

In the liquid crystal display, when a pulse voltage of 80V was applied between the electrodes for three milliseconds, the liquid crystal came to a planar state (showed green). At that time the Y value was 17.0. When a pulse voltage of 40V was applied for three milliseconds, the liquid crystal came to a focal-conic state (transparent), and the Y value was 1.5. Accordingly, the contrast was 11.3. With respect to this liquid crystal display, the contrast was high, the responsibility was good, and a drive by a low voltage was possible.

EXPERIMENTAL EXAMPLE 7

To nematic liquid crystal which contains a mixture of the liquid crystal phenylcyclohexane compounds of the chemical formulas ($G_{16}$), ($G_{48}$) and ($G_{70}$) at 55 wt %, a mixture of the liquid crystal tolan compounds of the chemical formulas ($H_8$), ($H_{25}$) and ($H_{36}$) at 9 wt %, a tricyclic compound at 22 wt % and an N-type compound at 14 wt %, the chiral agents of the chemical formulas ($A_7$), ($D_5$) and ($E_4$) were added at 24 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.16; the anisotropy of dielectric constant was 11.0; and the phase transition temperature to isotropic phase was 85° C. The liquid crystal composition was filled in a cell of the structure shown by FIG. 4. The gap of the cell was 7 μ, and on the electrodes of the respective substrates, polyimide alignment controlling layers (made by JSR Co., Ltd.) with a thickness of 1000 Å were provided. Furthermore, as the insulating layer, acrylic resin was formed into a membrane with a thickness of 1000 Å.

In the liquid crystal display, when a pulse voltage of 80V was applied between the electrodes for three milliseconds, the liquid crystal came to a planar state (showed green). At that time the Y value was 22.0. When a pulse voltage of 40V was applied for three milliseconds, the liquid crystal came to a focal-conic state (transparent), and the Y value was 1.8. Accordingly, the contrast was 12.2. With respect to this liquid crystal display, the contrast was high, the responsibility was good, and a drive by a low voltage was possible.

EXPERIMENTAL EXAMPLE 8

To nematic liquid crystal which contains a mixture of the liquid crystal phenylcyclohexane compounds of the chemical formulas ($G_{10}$), ($G_{26}$) and ($G_{56}$) at 55 wt %, a mixture of the liquid crystal tolan compounds of the chemical formulas ($H_{10}$), ($H_{30}$) and ($H_{45}$) at 9 wt %, a tricyclic compound at 22 wt % and an N-type compound at 14 wt %, the chiral agents of the chemical formulas ($A_7$), ($C_3$) and ($F_5$) were added at 24 wt % so that the liquid crystal would selectively reflect light of around 560 nm. Further, a coloring agent (Kayaset Yellow GN) was added at 0.5 wt %, and thus, a liquid crystal composition was prepared.

With respect to the nematic liquid crystal, the anisotropy of refractive index was 0.17; the anisotropy of dielectric constant was 9.0; and the phase transition temperature to isotropic phase was 87° C. The liquid crystal composition was filled in a cell of the structure shown by FIG. 5. The gap of the cell was 7 μm, and as the insulating layer, acrylic resin is formed into a membrane with a thickness of 1000 Å, and further, a red color filter with a thickness of 1000 Å was provided.

In the liquid crystal display, when a pulse voltage of 80V was applied between the electrodes for three milliseconds, the liquid crystal came to a planar state (showed green). At that time the Y value was 23.0. When a pulse voltage of 40V was applied for three milliseconds, the liquid crystal came to a focal-conic state (transparent), and the Y value was 1.8. Accordingly, the contrast was 12.8. With respect to this liquid crystal display, the contrast was high, the responsibility was good, and a drive by a low voltage was possible.

OTHER EMBODIMENTS

Although the displays described in the examples above are of a type which selectively reflects light of green, the present invention also brings the same effects to displays which selectively reflect other colors such as red, blue, etc.

The structure of a cell may be a network type which has a meshed composite layer composed of a liquid crystal composition and a polymeric resin composition. The columnar polymeric structure may be of a short type of which columns extend to the middle of the space between the substrates.

Although the present invention has been described in connection with the preferred embodiments above, it is to be noted that various changes and modifications are possible to those who are skilled in the art. Such changes and modifications are to be understood as being within the present invention.

What is claimed is:

1. A liquid crystal display comprising:
   a pair of substrates, at least one of which is transparent; and
   a liquid crystal composition, which exhibits a cholesteric phase having a selective reflection characteristic, said liquid crystal composition being filled between the substrates and containing a liquid crystal mixture and a chiral agent, the liquid crystal mixture comprising a liquid crystal phenylcyclohexane compound at a ratio within a range from 45 wt % to 60 wt % and a liquid crystal tolan compound at a ratio within a range from 5 wt % to 1 5 wt %, wherein the chiral agent is different from the liquid crystal phenylcyclohexane compound and the liquid crystal tolan compound.

2. A liquid crystal display as claimed in claim 1, wherein the liquid crystal composition contains nematic liquid crystal and a chiral agent.

3. A liquid crystal display as claimed in claim 1, wherein the liquid crystal composition contains nematic liquid crystal and a plurality of chiral agents.

4. A liquid crystal display as claimed in claim 1, wherein the liquid crystal composition contains a coloring agent.

5. A liquid crystal display as claimed in claim 1, wherein at least one of the substrates has an electrode covered with an insulating layer.

6. A liquid crystal display as claimed in claim 1, wherein at least one of the substrates has an alignment controlling layer or a color filter.

7. A liquid crystal display as claimed in claim 1, wherein a polymeric structure is provided between the substrates.

8. A liquid crystal display as claimed in claim 1, wherein the liquid crystal phenylcyclohexane compound contained in the liquid crystal composition is of the following chemical formula:

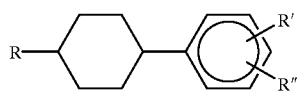

R: alkyl or alkoxyl with one to ten carbons
R', R'': alkyl or alkoxyl with one to ten carbons, cyano, halogen or hydrogen.

9. A liquid crystal display as claimed in claim 1, wherein the liquid crystal tolan compound contained in the liquid crystal composition is of the following chemical formula:

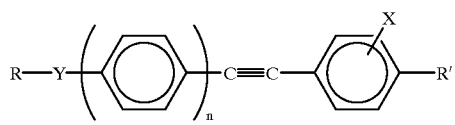

R: alkyl with one to ten carbons
Y: cyclohexane ring or single bond
X: halogen or hydrogen
n: 1 or 2
R': alkyl with one to ten carbons, halogen or the group shown by the following chemical formula

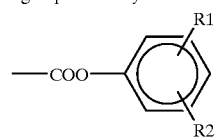

R1, R2: hydrogen, halogen or alkyl with one to ten carbons.

10. A liquid crystal display as claimed in claim 4, wherein the coloring agent is at least one selecting from the group of azo compounds, quinone compounds and anthraquinone compounds.

11. A liquid crystal display as claimed in claim 5, wherein the insulating layer is at least one selecting from the group of silicone oxide, polyimide resin, epoxy resin, acrylic resin and urethane resin.

12. A liquid crystal display as claimed in claim 6, wherein the alignment controlling layer is polyimide resin or silicone resin.

13. A liquid crystal display as claimed in claim 7, wherein the polymeric structure is acrylic ester.

14. A liquid crystal display as claimed in claim 1, wherein the liquid crystal mixture contains a total amount of the liquid crystal phenylcyclohexane compound and the liquid crystal tolan compound of not more than about 70 wt % of the liquid crystal mixture.

15. A liquid crystal composition exhibiting a cholesteric phase having a selective reflection characteristic, said liquid crystal composition comprising:
a liquid crystal mixture comprising:
a liquid crystal phenylcyclohexane compound at a ratio within a range from 45 wt % to 60 wt %; and
a liquid crystal tolan compound at a ratio within a range from 5 wt % to 15 wt %; and
a chiral agent that is different from the liquid crystal phenylcyclohexane compound and the liquid crystal tolan compound.

16. The liquid crystal display of claim 1, wherein said chiral agent is at least one compound selected from the formulae (A) to (F):

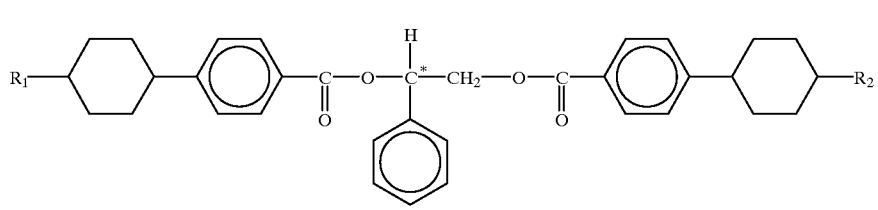

(A)

wherein $R_1$ and $R_2$ are alkyl or alkoxyl groups with 1–10 carbon atoms;

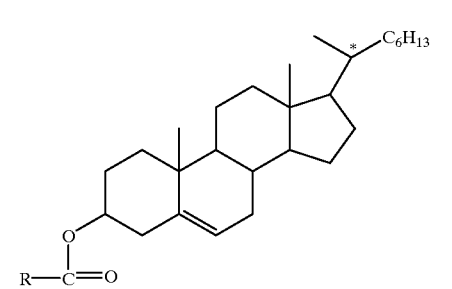

(B)

wherein R is an alkyl group with 1–10 carbon atoms;

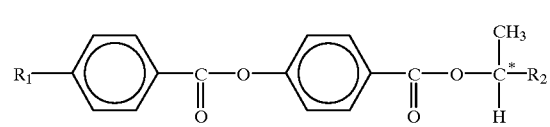

(C)

wherein $R_1$ is an alkyl or alkoxyl group with 1–10 carbon atoms and $R_2$ is an alkyl group with 2–10 carbon atoms;

(D)

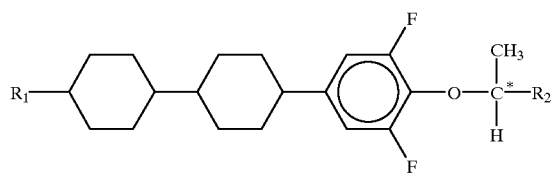

wherein $R_1$ is an alkyl or alkoxyl group with 1–10 carbon atoms and $R_2$ is an alkyl group with 2–10 carbon atoms;

(E)

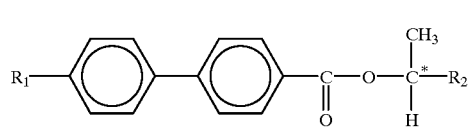

wherein $R_1$ is an alkyl or alkoxyl group with 1–10 carbon atoms and $R_2$ is an alkyl group with 2–10 carbon atoms; or (F)

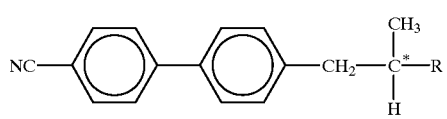

wherein R is an alkyl group with 2–10 carbon atoms.

17. The liquid crystal display of claim 16, wherein said chiral agent is at least two kinds of compounds selected from said formulae (A) to (F).

18. The liquid crystal composition of claim 15, wherein said chiral agent is at least one compound selected from the formulae (A) to (F):

(A)

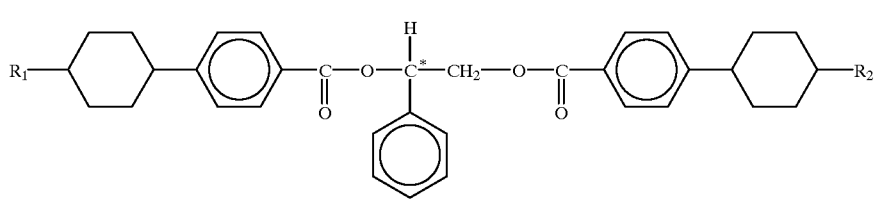

wherein $R_1$ and $R_2$ are alkyl or alkoxyl groups with 1–10 carbon atoms;

(B)

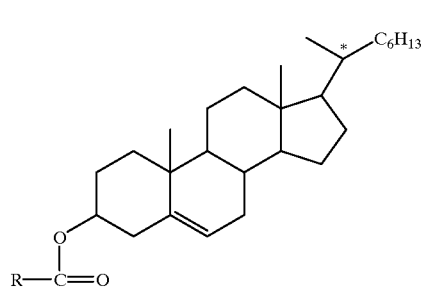

wherein R is an alkyl group with 1–10 carbon atoms;

(C)

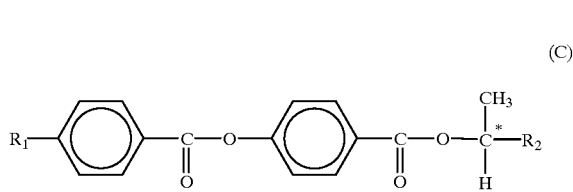

wherein $R_1$ is an alkyl or alkoxyl group with 1–10 carbon atoms and $R_2$ is an alkyl group with 2–10 carbon atoms;

(D)

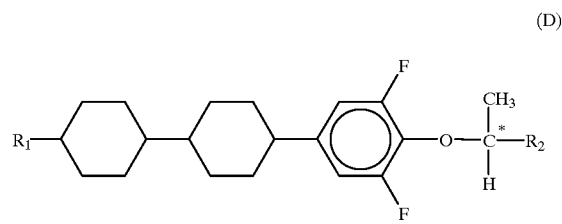

wherein $R_1$ is an alkyl or alkoxyl group with 1–10 carbon atoms and $R_2$ is an alkyl group with 2–10 carbon atoms;

(E)

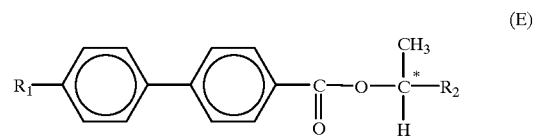

wherein $R_1$ is an alkyl or alkoxyl group with 1–10 carbon atoms and $R_2$ is an alkyl group with 2–10 carbon atoms; or (F)

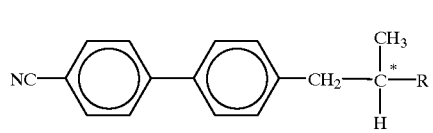

wherein R is an alkyl group with 2–10 carbon atoms.

19. The liquid crystal composition of claim 18, wherein said chiral agent is at least two kinds of compounds selected from said formulae (A) to (F).

* * * * *